No. 616,743. Patented Dec. 27, 1898.
J. H. SWIHART.
COMPUTING SCALE.
(Application filed Nov. 1, 1897.)
(No Model.)
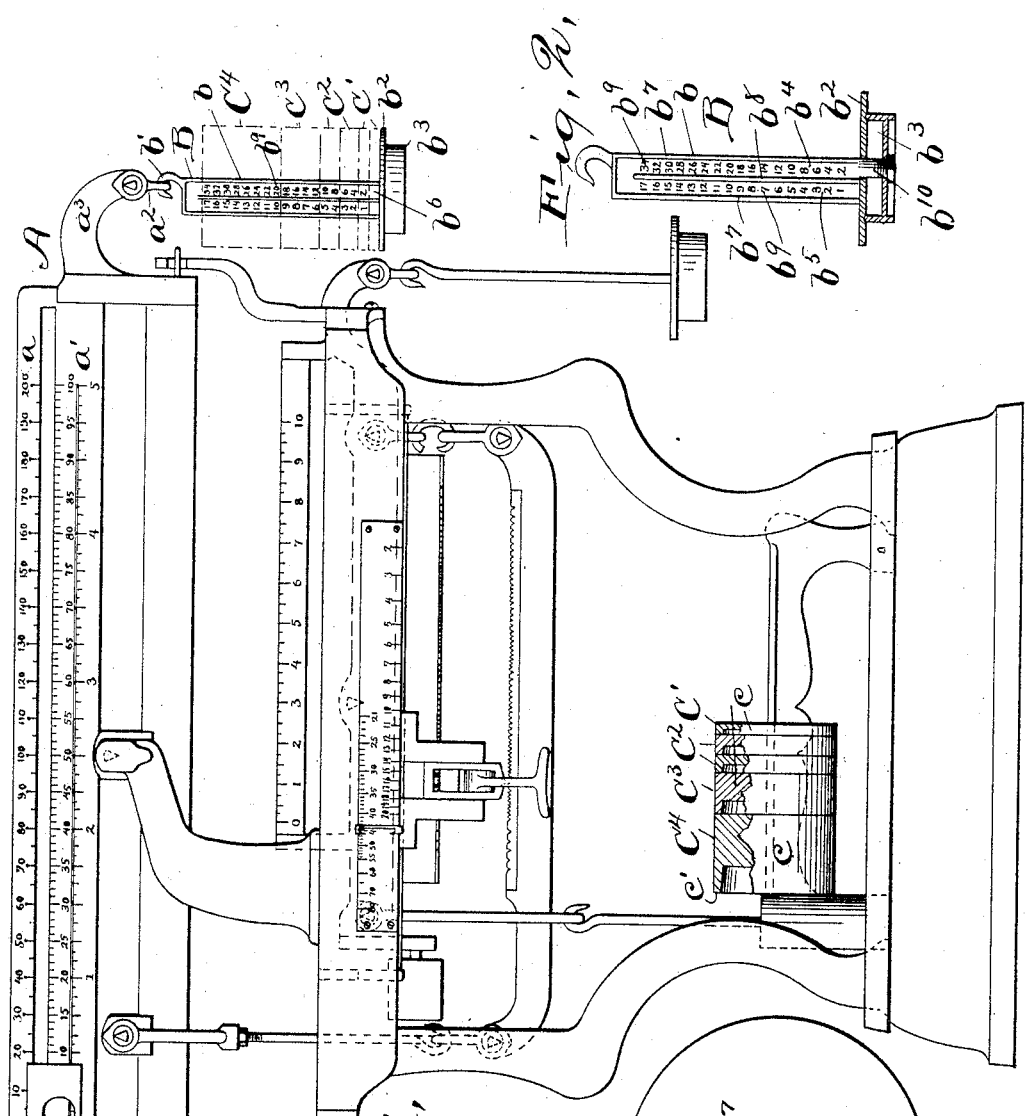
Witnesses,
E. B. Gilchrist
H. W. Beman
Inventor,
John Henry Swihart
By his Attorneys,
Thurston & Bates.
THE NORRIS PETERS CO., PHOTO-LITHO., WASHINGTON, D. C.

UNITED STATES PATENT OFFICE.

JOHN H. SWIHART, OF CLEVELAND, OHIO, ASSIGNOR TO THE NATIONAL COMPUTING SCALE COMPANY, OF SAME PLACE.

COMPUTING-SCALE.

SPECIFICATION forming part of Letters Patent No. 616,743, dated December 27, 1898.

Application filed November 1, 1897. Serial No. 657,127. (No model.)

*To all whom it may concern:*

Be it known that I, JOHN HENRY SWIHART, a citizen of the United States, residing at Cleveland, in the county of Cuyahoga and State of Ohio, have invented a certain new and useful Improvement in Computing-Scales, of which the following is a full, clear, and exact description, reference being had to the accompanying drawings.

This invention relates to the class of beam computing-scales wherein the value-beam has two series or rows of graduations—all the graduations of one series being the same multiple of corresponding graduations in the other series—whereby any point on said beam will indicate the value of an article on the scale at either of two rates which bear the same ratio to each other as do said value graduations. The purpose of this double graduation of the value-beam is to increase the capacity of the scale without increasing its size. To the same end counterweights have been used, each of said weights having two values expressed in money, which two values bear the same relation to each other as do corresponding graduations on the beam. These two money values have heretofore been marked upon each of these weights. Therefore to ascertain the value indicated by the scale when such weights are used it is necessary to add either the sum of all the low values which the weights indicate to the indicated low value on the beam or the sum of the high values indicated by said weights to the indicated high value on the beam. Because there are two sets of values indicated by the beam and by each weight there is great liability that the person using the scale will add together the high values indicated by the weights and the low values indicated by the beam, or vice versa, and there is also great liability that the operator in ascertaining the value represented by all of the weights used will add the high values of some to the low values of others. These liabilities to error are very objectionable, particularly in view of the fact that one of the chief advantages which computing-scales are designed to attain is the elimination of error in ascertaining values of articles.

In all beam computing-scales heretofore placed upon the market having two series of value graduations on the beam the extreme or highest values indicated by both series of graduations have not been expressed in even dollars, but, on the contrary, the graduations indicating the lower values have indicated values up to a fraction of a dollar only. This necessitates that the low value of the units-counterweight should be the same fraction of a dollar, and this of course necessitates in many cases the adding together of two fractions of a dollar—viz., that which the units-weight represents and that which the beam indicates to ascertain the value of the goods— instead of, as with the scale herein shown, adding to one or more even dollars represented by the weights the fractions of a dollar or cents indicated on the beam. Obviously the manner of graduating the value-beam heretofore in vogue and above referred to was another source of error.

The object of my invention is to make it possible to almost instantaneously ascertain the value of articles at either of two rates when money-value counterweights are necessarily used and to render it improbable at least that any error will be made in ascertaining such values.

To these ends the invention consists in the construction and combination of parts shown in the drawings and herinafter described, and definitely pointed out in the claims.

In the drawings, Figure 1 is a front elevation of a scale embodying my invention. Fig. 2 is a detached view of the pendant, the plate and cup being shown in vertical section; and Fig. 3 is a horizontal section of the pendant-stem.

The scale is, except in the features of construction constituting the invention, substantially like the computing-scale shown in certain prior patents granted to me—to wit, No. 575,077, granted January 12, 1897, for price and weighing scale, and No. 575,784, granted March 16, 1897, for computing-scale; but the invention is not limited to this scale.

The calculating or value beam A is provided with two series or horizontal rows of value graduations $a\ a'$, one graduation in each set being associated with the same point upon the beam. In the lower row, representing the low values, the highest graduation represents an even dollar. In the upper row, representing the high values, each graduation represents a value twice as great as the associated graduation in the other row, wherefore the highest value indicated by the upper row of graduations is two dollars even. The graduating marks and figures in the two rows are respectively made with or on contrasting colors—as, for example, the marks and figures in the lower row may be blue and those in the upper row may be red, or that part of the beam upon which the lower row of graduations is placed may be enameled blue or any color and the part of the beam upon which the upper row of graduations is placed may be enameled red or any contrasting color.

The counterpoise bar or pendant B is hung by a hook $b'$ on the upper end of its stem $b$ to a loop $a^2$ on the end of the neck $a^3$ of the beam A. To the lower end of this bar is secured the usual horizontal plate $b^2$ and cup $b^3$.

The weights $C'$ $C^2$ $C^3$ $C^4$ used with this scale have certain definite relations to each other not only with respect to their weights, but with respect to their thickness or height. The units-weight $C'$ is adapted to counterbalance as much weight as is counterbalanced by the poise $A'$ on the beam A when the same is moved to its extreme right end—viz., five pounds. The next larger weight $C^2$ is not only twice as heavy, but it is twice as thick or high. The next largest weight $C^3$ is four times as heavy and four times as thick or high as the units-weight. Each of these weights has not only a weight value, which in each case is proportionate to the thickness or height of said weight, but it has also two money values, which in the case of a units-weight are equal to the highest values indicated, respectively, by the two rows $a$ $a'$ of value graduations on the beam A—to wit, one dollar and two dollars. The money values of the next largest weight, which is twice as thick, are respectively twice as great—viz., two dollars and four dollars, and so on—the two money values of each weight being the same ratio to each other as are two corresponding value graduations on the beam.

On the vertical stem $b$ of the pendant, which is substantially a flat bar or plate, are two vertical columns $b^4$ $b^5$ of figures, $b^9$ indicating money values, the figures in one column being the same multiple of corresponding figures in the other column as are corresponding graduations on the value-beam, the multiple in the present case being two, and the smallest values, which are at the bottom of the column, represent, respectively, the two money values of the units-weight—that is to say, in the present case one dollar and two dollars. Any figure above the first in either column represents a value obtained by adding to the figure just below it the smallest or units figure of said column. Thus the value indicated by the figures in the low-value column increases from the bottom up in increments of one dollar and in the other column by increments of two dollars. The space, measured vertically, on the stem $b$ which is allotted to each horizontal row (pair) of figures $b^9$ is equal to the thickness of the units-weight; but between the bottom value-figures and the plate $b^2$ is a blank space $b^6$ on the stem $b$, whose height is equal to or a trifle greater than the thickness or height of the units-weight. Because of this arrangement of the indicating-figures upon the pendant-stem if the units-weight be placed upon the plate $b^2$, just above it will be seen the two figures "1" and "2," representing in dollars the two money values of said weight, so if any number of said weights be hung upon the pendant resting upon the plate $b^2$ and upon each other the two figures in the horizontal row next above the upper weight will represent in even dollars the two money values of all of said weights, no addition or calculation being necessary to ascertain said total values.

The figures $b^9$ in the two vertical columns on stem $b$ are in relief on a sunken ground, the edges $b^7$ of the bar and the rib $b^8$, dividing the two columns, being also in relief, whereby the figures themselves are protected from injury by the weights. The figures in the two columns are differently colored, said colors corresponding with the colors used to distinguish the rows of high and low values on the beam. The operator therefore, casting his eye from the beam to the pendant-stem, will naturally select the value-figure which corresponds in color to the indicated value-figure on the beam to which it is to be added.

It will be understood from the foregoing that the values indicated by the weights on the pendant-stem, whether one or more weights be used, are always expressed in even dollars. Therefore to ascertain the total value of an article upon the scale one need but add to the number of dollars so indicated the number of cents indicated on the beam—an operation which leaves little chance for error. This is the only addition necessary to be performed in using a scale having the features of construction described, because the weights are added automatically either at their high values or low values and their total is indicated on the pendant-stem. Therefore there is no chance of adding the high money value of one weight to the low money value of another, and the chance of adding the low value represented by the weights with the high values represented on the beam, or vice versa, is reduced to a minimum, because of the correspondence in coloring.

It is not desirable that the slots in the weights shall extend much, if any, past their center. It is also necessary, if the accuracy of the scale is to be preserved when counterweights are used, that the pendant shall hang in a vertical position, whether it is supporting a weight or not. The pendant-stem is therefore secured to the plate $b^2$, so that its central line is to one side of the center of said plate, while the hook $b'$ at the upper end of the bar is at one side of the bar, but practically over the center of the plate $b^2$—that is to say, over the center of gravity of the pendant.

In the specific construction the flat part of the stem has a cylindrical threaded end $b^{10}$, which is nearly in line with one vertical edge of said flat part, and the hook $b'$ is adjacent to the same edge and directly over said threaded end. The threaded end passes centrally through the plate and cup, which causes the central line of the flat part of the pendant to be, as before stated, to one side of the center of said plate.

When the parts are constructed as described, the counterpoise-bar will retain its vertical position when one or more weights are hung upon it.

In referring to the height of the weights I refer to the distance between the lower edge upon which they are supported and their top surface upon which the other weights rest; but in order that the units-weight may be thick enough to permit the use upon the pendant-stem of figures large enough to be easily readable and to preserve the described relation between the weight and thickness of said weights said weights are recessed in their lower surface. As these weights are shown partly in section in Fig. 1, they severally consist of a disk proper, $c$, and a depending annular flange $c'$, the lower edge of which being the part of the weight upon which they rest. The particular form of the weights shown is not essential, but it is valuable for the reasons stated and is believed to be new.

Having described my invention, I claim—

1. In a computing-scale, a value-beam having thereon two rows of money-value graduations, all of the graduations in one row being the same multiple of the corresponding graduations in the other row, combined with a pendant having on its stem two vertical rows of equally-spaced money-value figures, the figures in one row on said pendant being in the same ratio to the corresponding figures in the other row as are the corresponding graduations on the value-beam, the space between the bottom figures in said rows and the bottom pendant-plate being slightly greater than the thickness of the thinnest weight, and a plurality of weights having each two money values, the thickness of each weight being substantially equal to the vertical space on the pendant-stem allotted to each horizontal row of figures, or to some multiple thereof, substantially as specified.

2. In a computing-scale, a value-beam having thereon two rows of money-value graduations, all the graduations in one row being the same multiple of the corresponding graduations in the other row, each of said rows of graduations being characterized by a different color, combined with a pendant whose stem bears two vertical rows of equally-spaced money-value figures, the figures in one row being in the same ratio to the corresponding figures in the other row as are the corresponding graduations on the beam, and the figures in the high and low value column being respectively characterized by the same distinguishing colors as are the rows of a high and low graduations on the beam, the bottom figures in both columns being above the bottom plate of the pendant-bar a distance substantially equal to the thickness of the thinnest weight, and a plurality of weights having each two money values, the thickness of each weight being equal to the vertical space on the counterpoise-bar allotted to each horizontal row of value-figures, or to some multiple thereof, substantially as specified.

3. In a computing-scale, the combination with a value-beam having two rows of money-value graduations, with a pendant whose stem bears two vertical columns of equally-spaced raised figures, representing respectively high and low money valves, and vertical raised ribs, and the slotted weights $C'$ $C^2$, &c., whose thicknesses are all equal to the vertical space of the counterpoise-bar allotted to each horizontal row of value-figures, or to some multiple thereof, each weight having two money valves which are respectively equal to the two money values indicated by the bottom figures in said two vertical columns, or some multiple thereof proportionate to the thickness of the weight, substantially as specified.

4. In a computing-scale, a value-beam having two rows of graduations representing respectively high and low money valves at a fixed ratio to each other, the highest graduation in both rows representing values expressed in even dollars, combined with a pendant, the stem of which bears two vertical columns of figures representing money values in even dollars, all the figures in one column being in the same ratio to the corresponding figures in the other column as are corresponding graduations on said value-beam, and a series of weights each having two money values which values are respectively equal to the two highest values indicated on the beam, or some multiple thereof, the thickness of said weights being equal to the space on the pendant-stem allotted to each horizontal row of figures, or some multiple thereof, and a horizontal plate on the lower end of the pendant-stem, the top of said plate being below the bottom figures on the stem a distance substantially equal to the thickness of the units-weight, substantially as specified.

In testimony whereof I affix my signature in presence of two witnesses.

JOHN H. SWIHART.

Witnesses:
E. L. THURSTON,
ALBERT H. BATES.